Patented Dec. 19, 1933

1,940,383

UNITED STATES PATENT OFFICE 1,940,383

PHOSPHORUS AMIDE-ALDEHYDE RESIN AND METHOD OF PREPARING THE SAME

Willard H. Woodstock, Chicago Heights, Ill., assignor to Victor Chemical Works, a corporation of Illinois No Drawing. Application April 14, 1932
Serial No. 605,346

13 Claims. (Cl. 260—3)

This invention relates to phosphorus amide-aldehyde resins and a method of preparing the same.

In accordance with this invention a phosphorus amide such as thio phosphoryl amide ($PS(NH_2)_3$), phosphoryl amide ($PO(NH_2)_3$), or phosphorus amide ($P(NH_2)_3$) may be condensed with an aldehyde such as formaldehyde (HCHO). The reaction may be carried out directly between the phosphorus amides and the aldehyde, or the steps of preparing the amides from the corresponding phosphorus halogen compounds, for example, from the corresponding chloride compounds, and the condensation, may be carried out in the one reaction.

I. For example a thio phosphoryl-amide aldehyde resin may be prepared in the following manner. An aldehyde, for example, formaldehyde, may be added to ammonium hydroxide, preferably in a concentrated aqueous solution. A suitable proportion is one of 6 mols of hydroxide to 3 mols of formaldehyde. The reaction of the aldehyde and the ammonia takes place vigorously, generating heat. To the solution, thio phosphoryl chloride is then added slowly, preferably while the solution is still hot. A proportion of 1 mol $PSCl_3$ to 3 mols formaldehyde and 6 mols $NH_3$ is suitable. The addition of the $PSCl_3$ causes a vigorous reaction, and generates large quantities of heat. The solution turns milky and by the time all of the $PSCl_3$ has been added, a curd appears. The mixture is continuously stirred, and the curd grows in mass, while the milkiness disappears. Upon cooling, the resin is found in the form of a white sticky mass, having a consistency like that of soft taffy. When stretched, the material gave a sheen. The product possessed a strong odor resembling carbon disulphide. The compound is insoluble in water and somewhat soluble in hot ethylene glycol mono-butyl ether or diethylene glycol mono-ethyl ether. It is also slightly soluble in amyl acetate.

The resin was discovered to have remarkable rust-proofing qualities. For example, when some of the resin was painted on a warm iron panel and the metal heated in a free flame, a blue black coating was formed on the iron with an apparent chemical reaction. Immersion of the iron strip in distilled water exposed to the air, showed no rust on the treated portions after several hours, whereas the untreated portion showed immediate rusting. There was no rusting on the coated portions after several days of treatment under these conditions. Similar tests were made on metal strips covered with the resin, and baked in an oven at temperatures of 225° C. and above, for a period of approximately one-half hour. No rusting resulted.

II. A water soluble resin was prepared by adding 29.4 parts of paraformaldehyde and 55 parts of phosphorus thio chloride in xylene as a solvent. Ammonia gas was then admitted to the solution. A vigorous action took place and a fume of ammonium chloride was formed. Ammonia gas, equivalent to 70 ccs. of concentrated ammonium hydroxide, was used in the process. After all of the ammonia had been added, no hydrogen chloride was evolved, but the odor of hydrogen sulphide was strong. A light tan resin was produced, which was water soluble. When heated in water with excess ammonia and paraformaldehyde, it formed no precipitate.

III. A resin was likewise prepared by adding to 200 parts of water 74 parts of paraformaldehyde, the mixture being continuously agitated. 200 parts of 37% formaldehyde solution may be used instead of the solution of paraformaldehyde. To this solution, 324 parts of 0.90 specific gravity ammonium hydroxide were slowly added, causing the solution to rise in temperature to boiling point. 139 parts of phosphorus thio chloride was added to the hot ammoniacal solution. Each addition of 8 parts or more caused the mixture to boil. The mixture was filtered, and about 600 parts of a solution of a resin having a Bé. gravity at room temperature of about 15.0°, was obtained.

It was discovered that resins II and III were effective pickling inhibitors. For example, a solution of 4% sulphuric acid containing .5% of either resin II or resin III had substantially no action upon a sheet steel panel which had just previously been pickled clean in 5% sulphuric acid, and washed with distilled water. The sulphuric acid solution without the resin caused immediate evolution of hydrogen on the steel. All of the tests were made at 70° C. Even after standing several hours at this temperature the solutions containing the resins showed substantially no action of the acid upon the steel. Similar results were obtained with a solution of resin II and a solution of resin III on 75% phosphoric acid at 40° C. The inhibiting solution removed rust from rusty metal but dissolved very little of the metal itself. Similar tests were also made on 5% phosphoric acid, and the same results were obtained.

IV. 29.4 grams of paraformaldehyde was added to 250 cc. of cyclohexanol ($C_6H_{11}OH$), and 50 grams of phosphorus oxychloride added thereto. An exothermic reaction took place when the oxychloride was added. Ammonia gas, equivalent to 70 cc. of concentrated ammonium hydroxide was passed into the mixture. When the ammonia was added, a vigorous reaction took place and a dense fog appeared. The ammonia was added slowly over a period of one hour. A quantity of solid ammonium chloride was formed in the liquid. The mixture was filtered and the filtrate vacuum distilled to remove the excess cyclohexanol. The residue remaining was a viscous ruby-red resin which solidified on cooling. The resin was somewhat soluble in water and alcohol, but formed a fibrous precipitate which also went into the solution. The solution was amber in color. The resin was insoluble in ether, benzene, or amyl acetate.

V. The same quantities of reagents as used in IV were taken, with benzene as a solvent in place of the cyclohexanol. After ammoniating, the mixture was slowly refluxed. Some hydrochloric acid came off during this process and the refluxing was continued until no more was given off. At this stage the solution cleared and a thick viscous plastic mass was formed which was twisted around the agitator. The product solidified in air to a mass resembling taffy. The resin was hygroscopic and dissolved readily in water and alcohol. It was insoluble in benzene, ether, or amyl acetate. The water solution was acid to litmus.

VI. The same reagents were used as in V, with the solvent changed to xylene. The reaction was carried out at a higher temperature, due to the higher boiling point of the xylene. The procedure was the same as in V.—About 40 grams of a yellow resin was obtained which became rock-hard at room temperature. The product was water soluble, but insoluble in common organic solvents. The resin was an effective rust preventive, but not quite so good as resin I.

VII. The procedure of VI was followed, except that 34 cc. (55 gms.) of phosphorus thio-chloride were used instead of the oxychloride. The ammonium chloride fume was not as dense as in the previous reactions and no hydrochloric acid gas came off on refluxing, but there was a strong odor of hydrogen sulphide. About 45 gms. of a light tan resin which was molten in the hot xylene, was formed. The product was water soluble.

VIII. The phosphorus thio-chloride of Example VII was replaced by about 44.8 gms. (28.4 cc.) of phosphorus tri-chloride, and the amount of ammonia doubled. The reaction was vigorous and a viscous brown resin was produced which solidified to a brittle mass when removed from the hot solvent. The yield was about 88 gms. The product was water soluble and quite hygroscopic. It was insoluble in common organic solvents, but soluble in acetic acid.

IX. Example VIII was repeated, except that the paraformaldehyde was replaced by 94 grs. of furfuraldehyde. A dark brown precipitate was formed which dried to a powder. The product was slightly soluble in ether, slightly soluble in methanol, and partially soluble in water.

X. 28.4 cc. of phosphorus tri-chloride was added to 250 cc. of xylene, and ammonia gas equivalent to 70 cc. of concentrated ammonium hydroxide was passed through the mixture. Formaldehyde gas from 29.4 grams of formaldehyde was then passed through the ammonia delivery tube. A yellowish white curd-like resin was precipitated. This resin was water soluble.

The foregoing detailed description has been given for clearness of understanding only, and no unnecessary limitations should be understood therefrom, but the appended claims should be construed as broadly as permissible, in view of the prior art.

I claim:

1. A resinous compound comprising a reaction product of a phosphorous amide and an aldehyde.

2. A resinous compound comprising a reaction product of a phosphorous chloride, ammonia and an aldehyde.

3. A resinous compound comprising a reaction product of a phosphorous thio amide and an aldehyde.

4. A resinous compound comprising a reaction product of phosphoryl amide and an aldehyde.

5. A resinous compound comprising a reaction product of thio phosphoryl amide and formaldehyde.

6. The method of preparing a phosphorous resin which comprises reacting a phosphorous amide with an aldehyde.

7. The method of preparing a phosphorous resin which comprises reacting a phosphorous chloride with ammonia and adding an aldehyde to the resulting mixture.

8. The method of preparing a phosphorous resin which comprises reacting ammonia with an aldehyde and adding a phosphorous chloride to the resulting mixture.

9. The method of preparing a phosphorous resin which comprises reacting a phosphorous thio chloride with ammonia and adding an aldehyde to the resulting mixture.

10. The method of preparing a phosphorous resin which comprises reacting ammonia with an aldehyde and adding a phosphorous thio chloride to the resulting mixture.

11. The method of preparing a phosphorous resin which comprises reacting a phosphorous oxychloride with ammonia in the presence of an organic solvent and adding an aldehyde to the resulting reaction product.

12. The method of preparing a phosphorous resin which comprises adding ammonia to a solution of phosphorous oxychloride and an aldehyde and an inert organic solvent.

13. A resinous compound comprising a reaction product of phosphoryl amide and formaldehyde.

WILLARD H. WOODSTOCK.